United States Patent
Kato et al.

(10) Patent No.: US 7,240,834 B2
(45) Date of Patent: Jul. 10, 2007

(54) REAL-TIME RETAIL MARKETING SYSTEM AND METHOD

(75) Inventors: Mamoru Kato, Lexington, MA (US); Daniel N. Nikovski, Somerville, MA (US); Ajay Divakaran, Burlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 11/085,323

(22) Filed: Mar. 21, 2005

(65) Prior Publication Data
US 2006/0208070 A1   Sep. 21, 2006

(51) Int. Cl.
*G06K 30/00*   (2006.01)
(52) U.S. Cl. .................. 235/385; 705/22; 705/10
(58) Field of Classification Search ........... 235/383, 235/385; 705/14, 22, 28, 10
See application file for complete search history.

(56) References Cited

U.S. PATENT DOCUMENTS

| | | | |
|---|---|---|---|
| 5,704,017 A | 12/1997 | Heckerman et al. | 395/61 |
| 5,790,426 A * | 8/1998 | Robinson | 702/179 |
| 6,014,634 A * | 1/2000 | Scroggie et al. | 705/14 |
| 6,078,740 A * | 6/2000 | DeTreville | 703/22 |
| 6,092,049 A | 7/2000 | Chislenko et al. | 705/10 |
| 6,496,816 B1 | 12/2002 | Thiesson et al. | 706/52 |
| 6,507,279 B2 | 1/2003 | Loof | 340/572.1 |
| 6,633,232 B2 * | 10/2003 | Trajkovic et al. | 340/573.1 |
| 6,659,344 B2 | 12/2003 | Otto et al. | 235/381 |
| 6,843,415 B2 | 1/2005 | Vogler | 235/385 |
| 2002/0165755 A1 * | 11/2002 | Kitts | 705/10 |
| 2003/0115096 A1 | 6/2003 | Reynolds et al. | 705/14 |
| 2003/0132298 A1 | 7/2003 | Swartz et al. | 235/472.02 |
| 2004/0044564 A1 | 3/2004 | Dietz et al. | 705/10 |
| 2004/0044565 A1 | 3/2004 | Dietz et al. | |
| 2004/0158497 A1 * | 8/2004 | Brand | 705/26 |
| 2004/0210477 A1 | 10/2004 | Mcintyre et al. | |
| 2004/0254837 A1 | 12/2004 | Roshkoff | 705/14 |
| 2005/0003839 A1 | 1/2005 | Tripp | 455/466 |
| 2005/0043857 A1 * | 2/2005 | Van Fleet | 700/286 |

OTHER PUBLICATIONS

F. Porikli, O. Tuzel "Object Tracking in Low-Frame-Rate Video," Proceedings of SPIE/EI—Image and Video Communication and Processing, vol. 5685, p. 72-79, Mar. 2005.

* cited by examiner

*Primary Examiner*—Michael G. Lee
*Assistant Examiner*—Jamara A. Franklin
(74) *Attorney, Agent, or Firm*—Dirk Brinkman; Clifton D. Muellen; Gene V. Vinokur

(57) ABSTRACT

A marketing system and method for a retail environment periodically reads RFID tags attached to products to produce a list of product identifications. Consumer recommendation rules are updated according to each list, and recommendations are generated according to the updated consumer recommendation rules. Then, content can be displayed in the retail environment based on the recommendations.

21 Claims, 2 Drawing Sheets

REAL-TIME RETAIL MARKETING SYSTEM AND METHOD

FIELD OF THE INVENTION

This invention relates generally to retail marketing systems, and more particularly to retail marketing systems that provide real-time interactive advertising.

BACKGROUND OF THE INVENTION

Point-of-purchase advertising systems are common in the retail environment, see U.S. Patent Application No. 20030115096. Point-of-purchase advertising encourages consumers to purchase products.

Many products in the retail environment are identified and tracked using radio frequency identification (RFID) tags. The tags can encode uniform product codes (UPC), or electronic product codes (EPC). In most prior art systems, the tags are primarily used for inventory control and check-out.

U.S. Pat. No. 6,659,344 describes a system for monitoring automatically the movement of products equipped with RFID tags. The systems monitors when and where the products move by placing RFID readers on shelves, shopping baskets, racks, and check-out counters.

U.S. Pat. No. 6,507,279 describes a retail checkout system that incorporates access control, electronic article surveillance, and a RFID subsystem to direct advertising at individual consumers according to their buying habits. The consumers use either a cellular telephone or an interactive personal digital assistant to interact with the system.

U.S. Pat. No. 6,843,415 describes a monitoring system that detects RFID events as products are placed on shelves or removed from the shelves to maintain an inventory.

U.S. Patent Application 20030132298 describes a portable shopping system, and an improved order selection and fulfillment system that uses portable terminals, telephony, and the Internet. The terminals can be used to locate products, and to display product information and advertising.

U.S. Patent Application 20050003839 describes a system that collects data about consumer products and services using handheld RFID devices with a display to enable electronic commerce.

U.S. Patent Application 20040254837 describes a consumer marketing research system. Video monitors with RFID card readers are located in a retail store to provide advertisements to the consumers based on a profile of the consumer stored on a card carried by the consumer.

U.S. Patent Application 20040044564 describes a real-time retail display system in which advertising displays are updated interactively based on current behavior and demographic information of consumers and historical trends.

It is desired to provide a retail marketing system and method that can monitor and influence consumer product selections without explicit consumer identification. The system should be accurate, and work in real-time.

SUMMARY OF THE INVENTION

The present invention provides a retail marketing system and method that analyzes interactions of consumers with products to provide real-time advertising so as to influence purchase decisions.

In a typical retail interaction, such as buying a product, a consumer will first look at several similar products arranged in a display area. If the consumer is interested, one product will be selected and removed from the display area. The consumer will handle the product for a while, examining its appearance and structure, and then either return the product to the display area, try the product on for size, or use the product. The amount of time that the product was out of the display area is generally indicative of the amount of interest the consumer has in the product.

Unlike conventional consumer recommendation systems, the system according to the invention does not require explicit consumer identification. Instead, RFID tags and RFID readers are used to acquire information about how consumers interact with the products. The information includes specific product identifications, and times that indicate when and for how long the products were handled by consumers.

The information is processed in real-time to update consumer recommendation rules and to generate recommendations. The recommendations can then be used to display multimedia content near the products as the consumer interacts with the products.

Additional sensors such as motion detectors and cameras can be used to track consumers in the retail environment and update the recommendation rules according to the consumer trajectories.

DETAILED DESCRIPTION OF THE PREFERRED EMBODIMENTS

System and Method Structure

Figure 1:
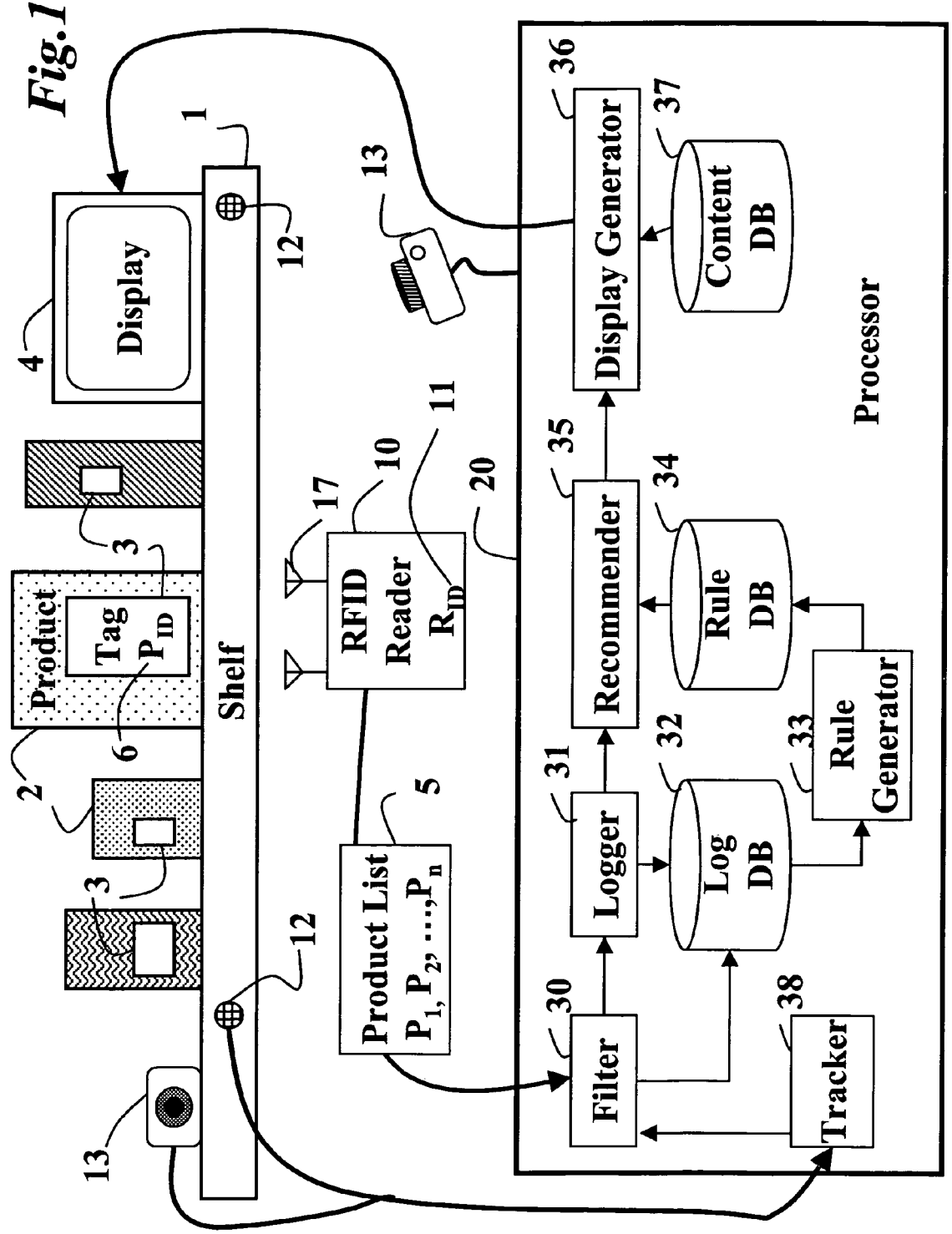
FIG. 1 is a block diagram of a retail marketing system and method according to the invention.

FIG. 1 shows a retail marketing system according to the invention. Product display areas 1, e.g., shelves, tables, or racks, in a retail environment contain products 2. Each product 2 includes a RFID tag 3 with a unique product identification ($P_{ID}$) 6, e.g., an electronic product code (EPC).

A display device 4 is located near the products. The display can include one or more 'windows'. The display device can be a CRT, LCD, plasma display, or projector (rear or front).

A RFID reader 10 is arranged in the vicinity of the tags. The reader can also be uniquely identified ($R_{ID}$) 11. With one or more readers, it is possible to have multiple instances of the same product at different locations in the environment. The display device 4 and RFID readers 10 communicate with a processor 20 using wired or wireless communication. The reader and products are arranged so that the reader cannot sense the RFID tags when the products are removed from the display areas. For example, the reader can include one or more directional antennas 17.

It should be understood, that the invention can operate with multiple display areas arranged along walls or aisles, or the product can be arranged on tables, or racks. The invention is not concerned with how products are arranged in the environment. Nor is the system constructed specifically to provide inventory control. Rather, the system detects how consumers interact with products, and displays advertising to the consumers according to the interaction.

The system can also include multiple readers and displays for many different products to cover an entire shopping environment.

Figure 2:
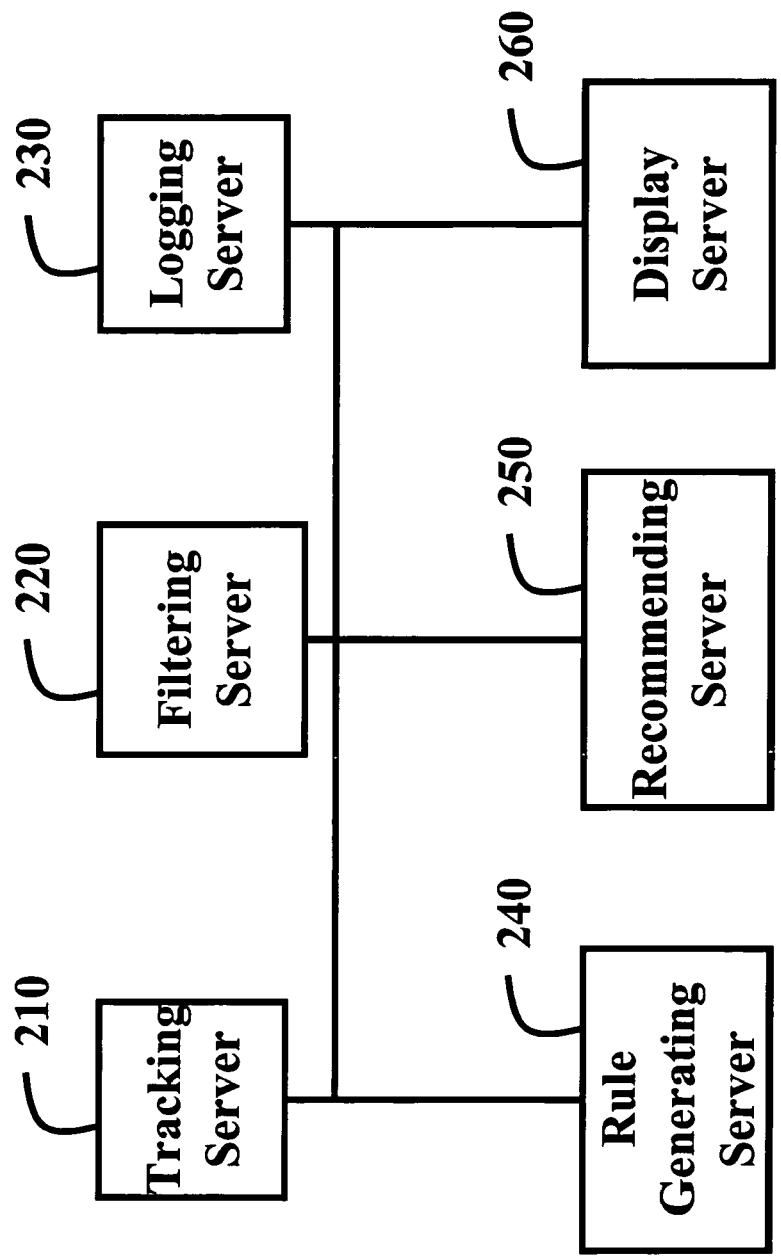
FIG. 2 is a block diagram of the retail marketing system configured as a local area network.

In this case as shown in FIG. 2, multiple processors can be arranged as a local area network (LAN), with various specialized server and client nodes, e.g., a tracking server 210, a filtering server 220, a logging server 230, a rule generating server 240, a recommending server 250, and a display server 260. Other combinations of servers are also possible.

It should be understood that the system can be installed in multiple retail environments, e.g., a 'chain' of department stores, and linked by a wide area network (WAN), e.g., the Internet. In any case, the system can operate in a centralized or distributed manner.

The processor executes a retail marketing method according to the invention. The method includes a filtering step 30, a logging step 31, a rule generating step 33, a recommending step 35, and a display generating step 36.

The processor has access to a log database (DB), 32, a recommendation-rule database 34, and a content database 37. The log database stores change records, described below. In the preferred embodiment, the rule database stores recommendation rules in the form of a 'thin' SVD matrix, see below. The content database stores information about products and advertisements, e.g., multimedia (video, audio, images, html, etc.). It should be noted, that in the case where there are multiple systems in multiple environments, the databases can be centralized or distributed.

System and Method Operation

The RFID reader 10 periodically scans for nearby RFID tags and produces a list 5 of product identifications ($P_{ID}$) for the filter 30 during each periodic scan. The filter stores the list, and determines if a previously read product ID on a previous list is missing from the current list. If an ID is missing, then the logger 31 is notified, and the $P_{ID}$, $R_{ID}$, and state are recorded. The state of the product is now OUT. A time stamp (TS) is also recorded. Thus, it can be determined how long a product is out of the display area, while the product is examined by the consumer.

For example, products X, Y and Z are in the display area. The current product list contains IDs for products X, Y and Z. If a consumer removes product X for examination, the next product list only includes IDs Y and Z. The filtering step 30 detects the removal of the product X and notifies the logging step 31. If the consumer returns the product X to the display area, then the next product list is X, Y and Z, and the state of the product is IN, and the logging step is notified accordingly, and the time stamps can be used to determine how long the product was not in the display area. Multiple changes in the product list can also be detected. For, example, the consumer selects two products for comparison, and then returns one of the products to display area.

The logging step stores the change notification as a record in the log database 32. The record can include fields for $P_{ID}$, $R_{ID}$, TS, and STATE (IN or OUT).

The rule generator 33 uses the records in the log DB to initialize and maintain the rule DB 34 in an incremental manner or periodically in a batch manner. Incremental rule generation means that every time a record is stored, the rule database is updated real time. This provides adaptive up-to-date recommendation rules. Batch rule generation updates the rule database periodically, for example, once an hour, or once a day.

Based on the currently stored rules, the recommender 35 selects content for the display generator 36 to display on the display device 4 using a collaborative filtering technique, preferably a 'thin' singular value decomposition (SVD), see U.S. Patent Application 20040158497, incorporated herein by reference. The amount of time that the product was out of the display area can indicate a relative level of interest, i.e., a rating, for the product by the consumer. The rule database 34 can also include a consumer/product preference model determined by conventional means. For example, the recommender can select content that gives more information about the product that was removed, or content that describes other related products, e.g., accessories for the product.

The recommender can also use other collaborative filtering techniques, see U.S. Pat. Nos. 5,704,017, 6,496,816, and 6,092,049 incorporated herein by reference.

If no changes are detected in the list for a particular display area, i.e., a current list is identical to a predetermined number of previous lists, then the system can display predetermined advertisements, including general, and seasonal advertisements to attract consumers.

The RFID reader 10 and products 2 can be arranged so that only a single consumer can access the product in the range of the RFID reader. In that case, if no changes are detected for more than a predetermined amount of time, then it can be assumed that the consumer is no longer in the vicinity of the product. Thus, a sequence or a group of product examinations, i.e., changes in the $P_{ID}$S on the lists, can be determined for a single consumer. This information can be used to generate the recommendation rules. The amount of time can be statistically calculated from previous values in the log DB 32, dynamically or off-line. A simple statistic is the average time. However, there can still be some ambiguities. More accurate recommendation results can be generated by providing consumer tracking.

Consumer Tracking

Therefore, the system can also be configured to track consumers. In this case, one or more motion or proximity sensors 12, e.g., passive or active infrared sensors, are arranged near the products 2. The sensors also communicate with the processor 20, using known communication techniques, and the method includes a tracking step 38.

In most consumer environments, display areas are arranged adjacently along walls and aisles. Therefore, it is possible to determine approximate trajectories of individual consumers, i.e., location and time, and store the trajectories in the log DB. The rules can be updated accordingly, and recommendations can be based on consumer trajectories, as well as products handled by the consumers along the trajectories.

Tracking of consumers can also be performed using one or more cameras 13 arranged near the products. If the camera is arranged on the display area, then the camera can view consumers directly. Alternatively, the cameras can be arranged to view the products as they are handled by consumers. The cameras acquire a sequence of images, i.e., a video. Note, that the cameras can be part of a surveillance system as is normally found in most modern retail environments.

In this case, the tracker 38 receives a video. The frame rate can be relatively low, to improve processing performance. Object tracking in videos is well known, see F. Porikli, O. Tuzel "Object Tracking in Low-Frame-Rate Video," Proceedings of SPIE/EI—Image and Video Communication and Processing, Vol. 5685, p. 72–79, March 2005, incorporated herein by reference. That method uses color histograms and a mean shift operation to identify and track each moving object in a video.

Object recognition can also be applied to determine the consumer characteristics, e.g., height, gender, race, and approximate age, and make recommendations accordingly. The object recognition can include face recognition, so that individual consumers can be tracked on a long-term basis, i.e., repeat visits by consumers can be considered by the recommender. Note, it is not necessary that the system has an exact identity of the consumer. It is sufficient to know that the same face has appeared repeatedly in the retail environment. Thus, the consumers' privacy is preserved. If the system is distributed in multiple environments, this information can be shared so that return visits by the consumers to different environments can be tracked. In other words, the output of the tracker can include spatial, chromatic, and demographic data that is time aligned.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A marketing method for a retail environment, comprising:
   reading periodically RFID tags attached to products in a retail environment to produce a plurality of lists of product identifications;
   updating consumer recommendation rules according to changes in the product identifications in the plurality of lists;
   generating recommendations according to the updated consumer recommendation rules;
   sensing consumers near the products to generate trajectories of the consumers in the retail environment;
   updating the consumer recommendation rules according to the trajectories; and
   displaying content in the retail environment based on the recommendations.

2. The method of claim 1, in which the updating and generating uses a thin singular value decomposition.

3. The method of claim 1, further comprising:
   associating a time with each product identification.

4. The method of claim 1, in which the content is predetermined when a current list is identical to a predetermined number of previous lists.

5. The method of claim 1, in which the sensing is performed by motion sensors.

6. The method of claim 1, further comprising:
   acquiring a sequence of images of consumers in the retail environment;
   generating trajectories of the consumers in the retail environment from the sequence of images; and
   updating the consumer recommendation rules according to the trajectories.

7. The method of claim 6, in which consumer characteristics are determined from the sequence of images, and further comprising:
   updating the consumer recommendation rules according to the consumer characteristics.

8. The method of claim 7, in which the consumer characteristics include height, gender, race, and approximate age.

9. The method of claim 1, further comprising:
   acquiring a sequence of images of consumers in the retail environment;
   recognizing faces in the sequence of images; and
   updating the consumer recommendation rules according to the recognized faces.

10. The method of claim 1, in which the updating is incremental in real time.

11. The method of claim 1, in which the updating is periodic.

12. The method of claim 1, in which the sensing is active by use of an infrared proximity sensor.

13. The method of claim 1, in which the sensing is passive by use of an infrared motion sensor.

14. The method of claim 1, further comprising:
   acquiring a sequence of images of the products and consumers in the retail environment;
   generating trajectories of consumers in the retail environment from the sequence of images; and
   updating the consumer recommendation rules according to the trajectories.

15. The method of claim 1, in which the updating and generating uses collaborative filtering.

16. The method of claim 1, in which the updating and generating uses an amount of time between changes on the plurality of lists for each product identification.

17. The method of claim 1, in which the updating and generating uses an amount of time that a current list is identical to a list.

18. The method of claim 1, in which the retail environment includes multiple stores and multiple display areas for arranging the products.

19. A marketing system for a retail environment, comprising:
   a plurality of RFID tags attached to products in a retail environment;
   an RFID reader configured to periodically read the RFID tags;
   means for updating consumer recommendation rules according to changes in a plurality of lists of product identifications produced by the RFID reader;
   means for generating recommendations according to the updated consumer recommendation rules;
   a sensor configured to detect consumers near the products to generate trajectories of consumers in the retail environment;
   means for updating the consumer recommendation rules according to the trajectories; and
   a display device configured to display content in the retail environment based on the recommendations.

20. The system of claim 19, in which the sensing is performed by motion sensors.

21. The system of claim 19, further comprising:
   a camera configured to acquire a sequence of images of consumers in the retail environment;
   means for generate trajectories of consumers in the retail environment from the sequence of images; and
   means for updating the consumer recommendation rules according to the trajectories.

* * * * *